FIP8102 XR 2,570,305 CROSS REFERENCE SEARCH ROOM

Oct. 9, 1951 H. L. BARNEY 2,570,305

ELECTRIC WAVE TRANSMISSION

Filed March 1, 1948 6 Sheets-Sheet 1

INVENTOR
H. L. BARNEY
BY N. S. Ewing
ATTORNEY

INVENTOR
H. L. BARNEY
BY
N. S. Ewing
ATTORNEY

Oct. 9, 1951 H. L. BARNEY 2,570,305

ELECTRIC WAVE TRANSMISSION

Filed March 1, 1948 6 Sheets-Sheet 3

INVENTOR
H. L. BARNEY
BY N. S. Ewing
ATTORNEY

Oct. 9, 1951 H. L. BARNEY 2,570,305

ELECTRIC WAVE TRANSMISSION

Filed March 1, 1948 6 Sheets-Sheet 4

INVENTOR
H. L. BARNEY
BY N. S. Ewing
ATTORNEY

INVENTOR
H. L. BARNEY
BY
N. S. Ewing
ATTORNEY

Oct. 9, 1951 H. L. BARNEY 2,570,305

ELECTRIC WAVE TRANSMISSION

Filed March 1, 1948 6 Sheets-Sheet 6

INVENTOR
H. L. BARNEY
BY
N. S. Ewing
ATTORNEY

Patented Oct. 9, 1951 2,570,305

UNITED STATES PATENT OFFICE 2,570,305

ELECTRIC WAVE TRANSMISSION

Harold L. Barney, Madison, N. J., assignor to Bell Telephone Laboratories, Incorporated, New York, N. Y., a corporation of New York Application March 1, 1948, Serial No. 12,381

5 Claims. (Cl. 250—6)

This invention relates to the measurement of the transmission properties of electrical transmission systems and to the compensation of variations in such properties.

In certain types of electrical signal transmission systems which are subject to rapid changes in the transmission properties, the necessity arises for measuring and compensating for such changes at frequent intervals without substantial interruption of the normal operation of the system for signal transmission. An example of a system of the aforesaid type is a transoceanic radio telephone system in which distortion arises in the received signal as a result of selective fading in the different frequency bands.

A broad object of the present invention is to facilitate the determination and modification of the transmission characteristics of electrical transducers inaccessible for ordinary measurement.

A more specific object of the invention is to determine the transmission characteristics of an electrical transducer over the complete frequency range within a very short interval of time, and to compensate for changes in the characteristics so determined.

In accordance with the present invention, the above-stated objects are attained by impressing intermittent pulses of short duration on the input of the electrical transducer under test, and receiving and translating the output response of the transducer to said pulses into a continual electrical or visual indication of the varying transmission properties thereof over the entire frequency range of interest. Because of the short duration of the test pulse, complete frequency measurements of the transmission properties of, for example, a transoceanic radio telephone circuit, can be made with substantially no interruption to the normal operation of the test system for signal transmission.

Moreover, a particular feature of the invention contemplates compensation for selective fading in the different frequency bands in an electrical transmission system, such as the aforementioned transoceanic radio telephone system, by means of a plurality of variable equalizers interposed in the signal transmission path of the said system, each of which equalizers is under control of the response of the system to the test pulse described in the foregoing paragraph.

In accordance with the present invention, the response of a network to an infinitesimally short pulse is translated into information about its transfer impedance through the agency of a device known in the art as a "transversal filter." This is a device which is adapted to produce a modified output function from an impressed input function by a series of operations which include (1) recording and storing the input signal; (2) multiplying the stored record by a predetermined weighting function; and (3) integrating the weighted record over discrete periods.

One embodiment of such a "transversal filter" is disclosed in my application Serial No. 731,343, filed February 27, 1947, Patent No. 2,451,465, dated October 19, 1948, which utilizes a supersonic light cell, in which the weighting function takes the form of a mask interposed in the patch of a light beam passing through the supersonic light cell at right angles to the direction of travel of trains of supersonic waves which are modulated in accordance with an impressed signal. The supersonic waves operate in the manner of a diffraction grating to modulate the light passing therethrough, a further modulation being imposed by the mask. The modulated light output of the supersonic cell is collected and integrated in a photoelectric cell to produce the desired output current.

In accordance with one embodiment of the present invention disclosed herein, the impulse response of the test network is recorded as a trace of modulated intensity on each of the screens of one or more cathode-ray oscilloscopes, which serve to replace the masks and the light sources in one or more supersonic light cells operating at selected frequencies. In certain alternative forms, the supersonic cell is replaced by a film, having density variations in accordance with selected frequencies or frequency bands, which is moved past the oscilloscope screen. The characteristics of the test network may thus be synthesized for any desired frequency or band of frequencies.

The invention is applied, in one embodiment herein disclosed, to a system for equalizing fading in a transoceanic radio telephone system. In such a system, an electrical impulse is periodically impressed on the test system, and the impulse response thereto detected and recorded on the screen of a cathode-ray tube, as outlined in the foregoing paragraph. The light output of the cathode-ray tube controls the respective outputs of a plurality of different frequency transversal filters comprising moving films, which in turn control the outputs of equalizers operating on different frequency bands of the received signal.

Other features and objects of the invention will be apparent from a study of the detailed specification and claims hereinafter and the attached drawings in which:

Figure 1:
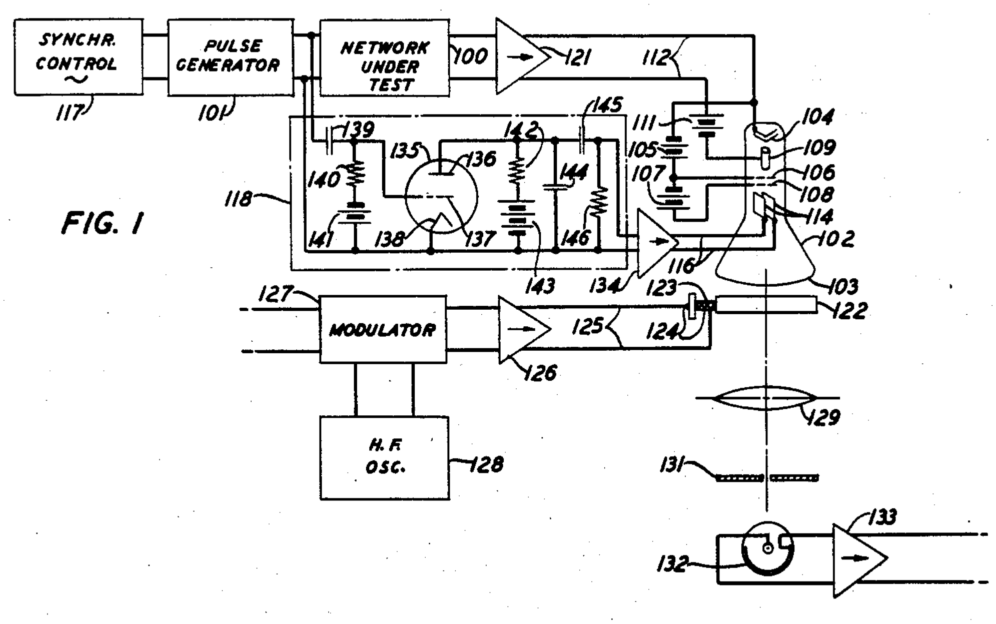
Fig. 1 shows an embodiment of the present invention which utilizes a supersonic light cell transversal filter for determining the loss frequency characteristic of a test network.

Figs. 7A–7E, and 8A and 8B indicate wave forms in different parts of the transmitting and receiving circuits.

It can be shown mathematically that if the response of any network to an infinitesimally short pulse is known, no further information about the network is necessary to establish its phase and amplitude versus frequency characteristics. Likewise the impulse response of the network may be calculated from a knowledge of the phase and amplitude versus frequency characteristics. The theoretical background for these two statements has been well established and is reviewed in my application Serial No. 731,343, filed February 27, 1947.

A concept which may be helpful in interpreting the term "impulse response" as used in the specification and claims hereinafter is that of the "transfer indicial admittance" of a system. This quantity is defined by J. R. Carson in Electric Circuit Theory and the Operational Calculus, McGraw-Hill, 1926, page 14, as the ratio of the output current of the system, expressed as a time function, to the magnitude of the steady electromotive force suddenly inserted at the input of the system at time $t=0$.

The time rate of change of the transfer indicial admittance defined above is a function of time, designated $g(t)$. The function $g(t)$ is variously referred to in the specification and claims hereinafter as the "impulse response" or merely the "$g$-function" of a system.

This $g$-function of the system is uniquely related to the transfer admittance characteristic, in that the transfer admittance is the Fourier transform of the $g$-function, and vice versa. If the $g$-function is of a simple form listed in "The Practical Application of the Fourier Integral" by G. A. Campbell in the Bell System Technical Journal for October 1928, its Fourier transforms, also listed therein, would specify the shape of the transfer admittance versus frequency.

Assuming the impulse responce of $g(t)$ function of the network is not a simple function listed in Campbell's table, information about the transfer admittance may still be obtained from it by automatic means, using the following procedure. When the short impulse is sent into the network, the output, or impulse response, is recorded. It is recorded in some way so that its values can be multiplied by signal values through the agency of a transversal filter.

It is apparent that a device which automatically converts information about the impulse response of a network into information about its transfer admittance has considerable practical importance. In accordance with the present invention this automatic translation is accomplished by utilizing certain steps of the transversal filter technique outlined in my application supra. Briefly, the procedure includes the following steps:

1. Applying a very short pulse of voltage to the input terminals of the network under test;

2. Recording the output of the network from the above input signal in a manner which can be used to determine the weighting function of a transversal filter; and 3. Measuring the transfer admittance of the transversal filter.

A particular circuit configuration designed to perform these functions is described in the following paragraphs, together with its proposed method of operation and advantages.

In the supersonic light cell form of transversal filter such as shown in Figs. 3A, 3B and 3C of my application supra, the signals are assumed to be impressed as modulations on a supersonic carrier transmitted down a cell, with light transmitted through the cell at right angles to the direction of propagation of the supersonic wave. The carrier frequency waves in the cell operate on the light beam in the manner of a diffraction grating, whereby the variations of carrier intensity caused by the signal modulation change the effective grating spacing. The light passing through the cell is focussed on a slit, and the amount of light passing through the slit is then dependent on the signal modulation of the carrier. Interposed between the cell and the lens which focusses the light on the slit is a mask on which is recorded the $g(t)$ function either as a variable area or variable density record. The product of the signal stored in the cell times the $g(t)$ function, is integrated by the action of the light passing through the cell and the mask, and the desired output is taken from a photocell on which the resultant light falls.

As mentioned hereinbefore, if the impulse response of the network is known to be a function having a form listed in Campbell's table of Fourier integrals, its Fourier transform also listed therein specifies the form of the transfer admittance directly. In the practical case however, the impulse response of a network, even of a relatively simple one such as a high-pass or low-pass filter, is not usually of a form which is listed. If, for example, the network under consideration is a toll telephone circuit or a radio telephone link, the impulse response may be a very complex function of time.

One application of a supersonic transversal filter, such as described in the foregoing paragraphs is in the determination of the real and imaginary parts of the Fourier transform of the impulse response. For example, if one had a wave form representing a $g$-function, its complex Fourier transform could be determined merely by cutting out a mask with the outline of the wave form, putting the mask before a supersonic light cell illuminated with an even light field of parallel rays, and measuring the phase and attenuation versus frequency characteristics of the transversal filter so found.

A system designed in accordance with the present invention, which in one embodiment includes the supersonic light-cell transversal filter described in the foregoing paragraphs, may be utilized to determine at frequent intervals the loss-frequency characteristics of certain test systems which are inaccessible for ordinary measurement. This technique is carried out in a system which is arranged as shown in Fig. 1 of the drawings, in which a short pulse is applied to the test network at repetitive intervals.

In the circuit illustrated in Fig. 1 the $g(t)$ function, or output, of the network under test when a short pulse is applied to the input, is recorded on a cathode-ray tube screen as an intensity-modulated line across the face of the screen, a control circuit operating to synchronize the cathode-ray tube sweep voltage timing with the pulse transmission. The line thereby traced on the screen of the cathode-ray tube replaces both the light source and the mask of a transversal filter of such form as disclosed in my application Serial No. 731,343, supra. The multiplication of the $g(t)$ function laid down on the oscilloscope face by certain selected frequencies transmitted through the supersonic cell then takes place in the same manner as previously described, giving an output from the photocell which gives the desired loss-frequency characteristics of the system.

The circuit of Fig. 1 of the drawings will now be described in detail.

The input terminals of test network 100, whose loss-frequency characteristic is to be determined, are connected to receive the output voltage of a pulse generator 101, which is preferably a blocking oscillator of a type such as shown on page 514 of the Radio Engineer's Handbook by F. E. Terman, McGraw-Hill Book Company, Inc., 1934. This is adapted to produce very short rectangularly shaped pulses at a repetition rate of three per second, for example, and having a duration of a few tenths of a millisecond. The operation of the pulse generator 101 is synchronized by the conventional sine wave oscillator 117 which is operated at the desired frequency.

The output of the test network 100 is connected in the following manner to intensity-modulate the beam of a conventional cathode-ray oscilloscope 102. Output terminals of the network 100 are connected to the control grid 109 and cathode 104 of cathode-ray tube 102 through amplifier 121 and bias battery 111. Conventional electron gun elements in the cathode-ray tube are supplied with normal operating potentials by batteries 105 and 107. Battery 105 supplies voltage to make the first anode 106 about 700 volts positive with respect to cathode 104, and battery 107 supplies 1700 volts additional to make the second anode 108 about 2400 volts positive with respect to the cathode, for example. In order that the intensity varied beam of the cathode-ray oscilloscope 102 may begin a new sweep from left to right across the phosphor screen 103 each time a pulse is impressed on the network 100, the horizontal deflecting plates 114 are connected through the leads 116 and the conventional amplifier 134 to the saw-tooth generator 118 which is also driven by pulses from the output of pulse generator 101.

The saw-tooth generator 118 may comprise a circuit connected in accordance with well-known practice, in the following manner. The triode 135, which includes the cathode 138, grid 137 and plate 136, is biased to cut-off by a connection to the grid 137 from battery 141 through resistor 140. The pulses from pulse generator 101, transmitted through series condenser 139, drive the grid 137 of triode 135 to a less negative potential whereby plate current flows to plate 136 from battery 143 through a relatively high resistance 142 connected therebetween. During this period current also flows from condenser 144 connected across the battery 143 and resistance 142 discharging it quickly. In the periods between application of pulses from the pulse generator 101 to grid 137, condenser 144 is charged toward the value of potential of battery 143 through high resistance 142. The cyclic variation of voltage across 144 is transmitted through condenser 145 which is connected to the input of amplifier 134, across whose input terminals is shunted resistance 146.

The output of amplifier 134 applied to deflection plates 114 through leads 116, causes the electron beam of cathode-ray tube 102 to be deflected from one side of the tube to the other in a linear manner with respect to time, with a very short fly-back time between successive linear sweeps.

The electron beam, striking phosphorescent screen 103 in the end of tube 102, records thereon a line of varying intensity, according to the impulse response signal applied to grid 109 of tube 102. Phosphorescent screen 103 is of the long persistence type preferably having a decay of brightness characteristic such as illustrated with reference to a No. 7 phosphor type screen on data sheet 92CL-6804 of RCA Tube Handbook HB-3.

The surface of tube 102 containing phosphor screen 103 is placed adjacent to supersonic light cell 122 so that the light rays from 103 pass through supersonic cell 122 and are focussed by the cylindrical lens 129 on slit 131 which is disposed with its long dimension normal to the plane of the drawing. Light rays passing through slit 131 fall on the sensitized surface of the conventional photocell 132, resulting in signal currents which are amplified by the conventional amplifier 133. The supersonic light cell 122 and associated transducer 123, high frequency oscillator 128, modulator 127, and amplifier 126, are essentially of the form shown in Figs. 3A, 3B and 3C of my application Serial No. 731,343, supra.

In effect, the arrangement described in the foregoing paragraphs sets up a frequency selective network which has the same transmission characteristics as the network under test, and it does this on the basis of information received when a short impulse is transmitted through the network under test. Such a system has little practical value where it is possible to measure the network under test directly; but it is useful in the many practical cases in which the network cannot be measured directly for any reason such as lack of circuit time which is required for such measurement, or rapidly changing transmission characteristics, assuming it is possible to record the impulse response of the system.

In addition to the arrangement described in the foregoing paragraphs, it will be apparent that other means may be used to store the impulse response function in a form such as to provide a transversal filter. Once this transversal network is set up, an automatic loss-frequency measuring set can be used to plot the characteristic over the desired frequency range.

For proper operation in a measuring circuit such as described in the foregoing pages, the impulse response must be recorded practically in its entirety, that is, in sufficient length to include all significant values. Theoretically it may extend from minus to plus infinity, but practically the significant part of an impulse response for a voice frequency circuit usually has a duration of only a few milliseconds. If the essential part of an impulse response is 5 milliseconds long, for example, it must be multiplied by an equal length of the stored sine wave signal to duplicate in the transversal filter, the characteristic of the network under test. In a supersonic light cell storage system, for example, 5 milliseconds storage would require a cell twenty feet long, which means that the supersonic cell storage system should be preferably used to simulate networks having much broader frequency bands than the audio frequency range, for which the impulse responses would be considerably shorter than a millisecond. It is, therefore, apparent that the dimensions of the storage cell would be practicable preferably in the range of several hundred kilocycles or more, with ordinary selective network characteristics.

In accordance with a modification of the embodiment of Fig. 1, storage for a sine wave measuring signal is obtained by using a moving strip of film on which are recorded in variable density, the striations corresponding to sine wave frequencies covering the range of interest. That is, if the frequency range of interest were from 100 to 3500 cycles, the film would have recorded on it a continuously changing frequency starting at 100 and continuing up to 3500 cycles. When this film is moved past the cathode-ray tube face on which the impulse response is stored and the total light collected directly in a photocell, the output will vary in amplitude with the various frequencies recorded on the film. This output variation in amplitude versus frequency will be the same as the transmission frequency characteristic of the network under test. Such a system is suitable for use preferably at audio frequencies.

In this moving film arrangement, the speed required of the film will be determined by the length of the impulse response portrayed on the oscilloscope face. For example, if the time duration of the impulse response is 4 milliseconds, and it is applied with a sweep rate such that it is spread out over 4 inches of the oscilloscope face, then the film must move past the face at the rate of 4 inches in 4 milliseconds, or 83⅓ feet per second. This may be more easily visualized if it is assumed that a single infinitesimally short pulse were recorded on the film instead of the sinusoidal wave form. In this case, the signal out of the system would be the product of the short pulse and the impulse response, which would be simply the impulse response itself if the short pulse on the film were moved past the oscilloscope face at the specificed rate of 4 inches in 4 milliseconds. Any other rate of film motion would give shorter or longer output impulse responses, which would correspond to upward or downward shifts in the over-all loss versus frequency characteristic of the transversal filter. If the 4-millisecond period were recorded in 1-inch space on the cathode-ray tube face, the rate of film movement would be one-fourth as fast, or about 21 feet per second. An expedient which could be used to reduce the required rate of film travel is the use of an optical system interposed between the oscilloscope and the film so as to form a reduced image of the impulse response on the moving film.

If the impulse response of the network under test has both positive and negative values, a somewhat similar technique is required to that described with reference to Fig. 4A in my application Serial No. 731,343, supra. The positive and negative components of the impulse response are separated and each applied to modulate separate cathode-ray oscilloscope beams. The light from the two oscilloscopes is focussed on the two halves of the same strip of film and collected on the other side by two photocells whose outputs are connected together in push-pull.

Figure 2:
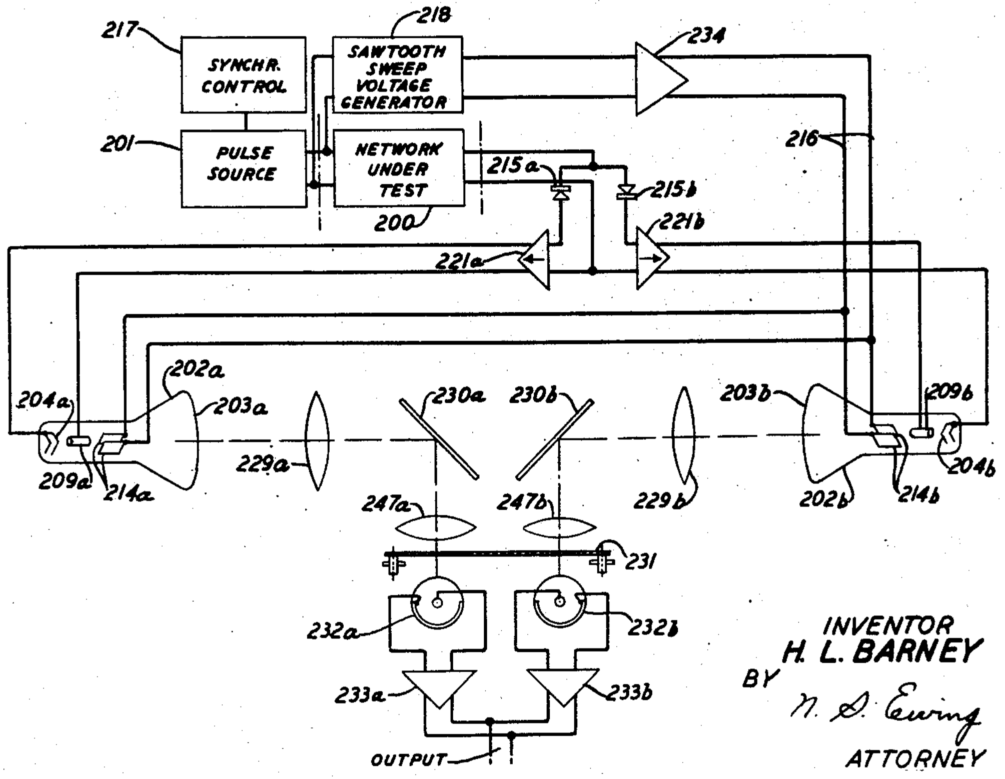
Fig. 2 shows a modification of the system shown in Fig. 1 which is adapted to utilize an impulse response having both positive and negative components, and wherein a moving film replaces the supersonic light cell in the foregoing embodiment.

The two expedients discussed in the foregoing paragraphs, namely, a moving film for storing the measuring signal, and parallel systems connected in push-pull for utilizing positive and negative components of the test function, are combined, for the purpose of illustration, in the system shown in Fig. 2 of the drawings.

Referring to Fig. 2, the synchronizing control 217, pulse generator 201, saw-tooth sweep voltage generator 218, amplifier 234, and network under test 200 are similar to the corresponding elements 117, 101, 118, 134 and network 100, respectively, of Fig. 1. In this case the output of the network under test passes through unilateral devices 215a and 215b which are so poled that the positive half of the wave is transmitted through 215b and amplifier 221b to the grid 209b and cathode 204b of cathode-ray tube 202b, while the negative half of the wave out of network 100 passes through 215a and amplifier 221a to grid 209a and cathode 204a of cathode-ray tube 202a. Tubes 202a and 202b have operating potentials supplied which are substantially the same as for tube 102 of Fig. 1. Deflecting plates 214a and 214b are connected to the output of amplifier 234, and arranged to deflect the beams linearly with saw-tooth waves as in Fig. 1. The image of the line traced out by the spot on phosphor screen 203a which represents the negative component of the $g$-function is focussed on film 231 by lenses 229a and 247a and mirror 230a. The image of the line on screen 203b which represents the positive component of the $g$-function is focussed on film 231 by lens 229b and 247b and mirror 230b.

Film 231 is driven by conventional means to move along a line normal to the plane of the illustration, and has recorded on it in variable density, sine waves of the particular frequency or band of frequencies with which it is desired to make measurements, such as described hereinbefore. The light passing through film 231 into photocell 232a results in an electrical signal which is amplified by the conventional amplifier 233a. The light passing through the film 231 into photocell 232b results in an electrical signal which is amplified by a corresponding amplifier 233b. The outputs of amplifiers 233a and 233b are connected in push-pull to give the desired composite output signal.

The techniques disclosed in the foregoing pages are particularly applicable for measuring the transmission characteristics of, for example, a transoceanic radio telephone system which is in continuous use for signal transmission. In such case, instead of running a strip of film having a wide range of frequencies past the face of a single oscilloscope tube, the transmission loss at a number of different frequencies can be measured simultaneously by operating a plurality of cathode-ray tubes in parallel, each of which is associated with a strip of film having a single frequency recorded on it. Thus, assuming sets of tubes and films are provided for each 200 cycles in the speech frequency band, the frequency characteristic of the network will be defined at points spaced 200 cycles apart by the simultaneous outputs of the measuring circuits.

A system in accordance with the present invention as described with reference to Figs. 1 and 2 hereinbefore can be readily applied to the equalization of a test network to make its response essentially constant over a given frequency band, so as to compensate, for example, for short wave radio circuit fading. The outputs of several measuring circuits connected in parallel can thus be utilized to adjust the gains of corresponding frequency sub-bands over the signal transmission band.

Circuits in accordance with the present invention for the compensation of selective fading in a transoceanic radio telephone system are shown in Figs. 3, 4, 5 and 6.

In the circuits shown, an electrical impulse is periodically impressed on the test system at the transmitting station, during short intervals in which the normal signal transmission is blocked. At the receiving station a long range synchronizing control permits reception of the impulse response and blocks signal reception for corresponding periods. The impulse response is separately multiplied by different selected frequencies in each of a plurality of transversal filters operating in the manner described, and the respective different frequency outputs utilized to control the signal outputs in each of a plurality of corresponding frequency sub-bands.

Figure 3:
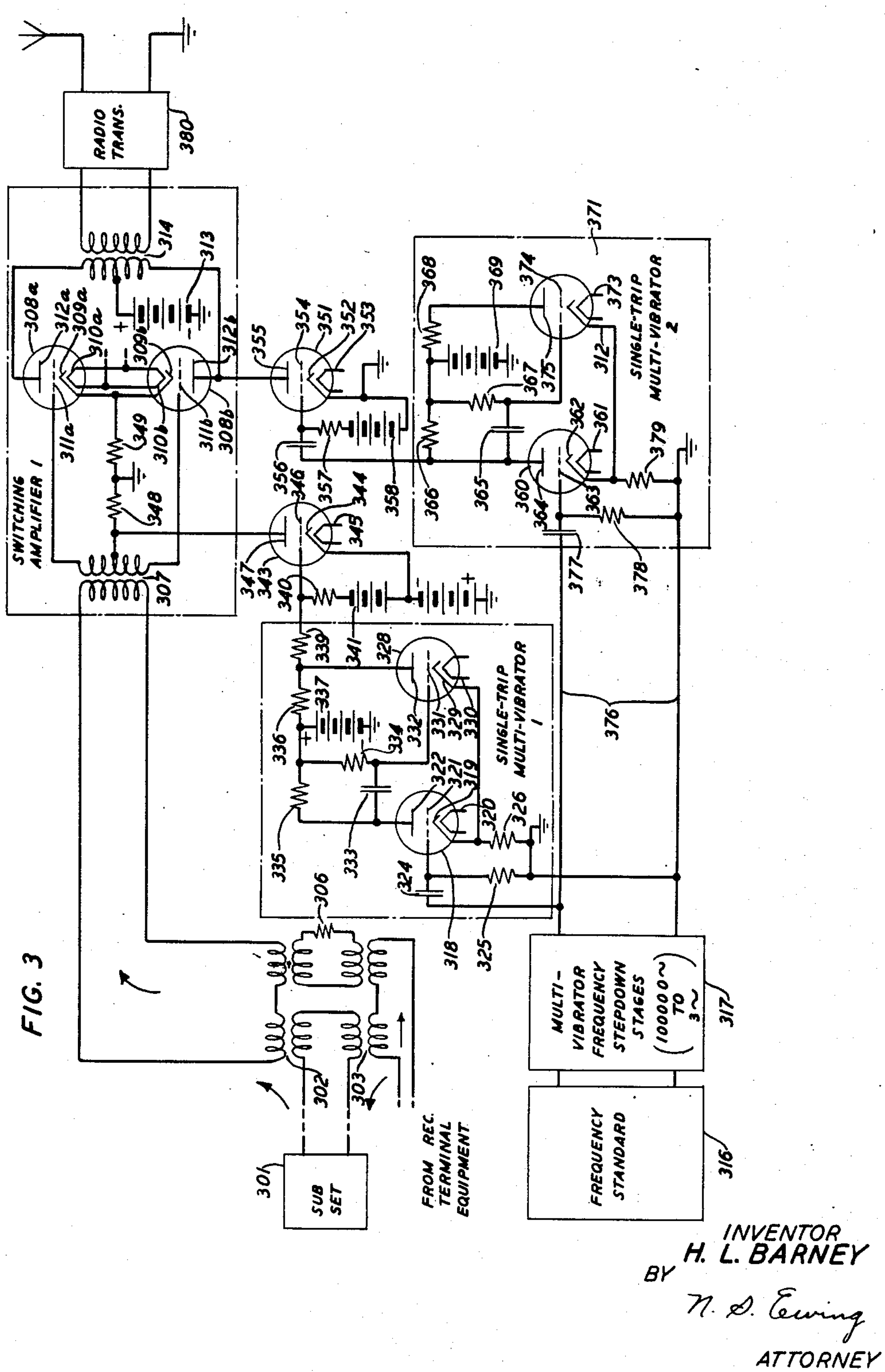
Fig. 3 shows a transmitting circuit in accordance with the present invention in a system for equalizing fading in a transoceanic radio telephone system.

In the transmitting circuit of a system of the aforesaid type which is shown in Fig. 3, the transmission of speech signals from the conventional telephone subset 301 through the radio transmitting equipment 380 which comprises a conventional source of carrier oscillations, is interrupted at intervals of a third of a second for a period of a few milliseconds by the switching amplifier No. 1. This is actuated by a circuit including the single-trip multivibrator No. 1, the operation of which is synchronized through a circuit connected to the frequency standard 316. During the short period of interruption, a test impulse is impressed on the radio transmitting circuit 380 by means of a second circuit connected to the switching amplifier No. 1 which is actuated through the single-trip multivibrator No. 2, whose operation is also synchronized by the frequency standard 316.

Referring in detail to Fig. 3 the subscriber's subset 301, which comprises conventional audio transmitting and receiving equipment, is shown connected to terminating network comprising transformers 302 and 303, with hybrid balancing resistor 306. Signals pass through this terminating network from subset 301 to transformer 307. The secondary of the transformer 307 is connected to grids 311a and 311b of push-pull tubes 308a and 308b. Plates 312a and 312b of tubes 308a and 308b are connected to the primary winding of transformer 314 and receive plate current from battery 313 which is connected to a center tap of the said primary winding. The secondary of transformer 314 is connected to a conventional radio transmitter 380. The cathodes 309a and 309b of tubes 308a and 308b are joined together and connected to ground through resistance 349 for the purpose of supplying a normal operating bias of a few volts potential between grids and cathodes of said tubes. Resistance 348 is connected between the mid-point of the secondary of transformer 307 and ground, so that a current flow of a few milliamperes in the plate circuit of tube 343 will result in a voltage drop across resistance 348 of sufficient magnitude to bias the grids 311a and 311b of tubes 308a and 308b to cut-off.

Tubes 308a and 308b with transformers 307 and 314 and associated voltage supplies, constitutes switching amplifier No. 1 whose amplification may be switched between a normal value of 50, for example, and effectively zero by the control of plate current flow in tube 343. The means for controlling tube 343 will be described in detail as follows.

A source of stable oscillations 316 such as disclosed in Sales Bulletin D-175730 T-22-12, Primary Frequency Standard, issued by Western Electric Company, Incorporated, July 1947, is connected to multivibrator type frequency step-down circuit 317 comprising a number of stages in tandem with step-down ratios so arranged as to provide a synchronized output frequency of 3 or 4 cycles when the input is 100,000 cycles from the crystal oscillator 316. The multivibrator stages are essentially as described on pages 512-514 of the "Radio Engineer's Handbook," by F. E. Terman, McGraw-Hill Book Company, Inc., 1943, and produce an output 3 or 4 cycle signal which is approximately a series of square wave pulses. This low frequency square wave output is connected to the inputs in parallel of two single-trip multivibrators. These multivibrators are of a type described in an article entitled "Multivibrator Circuits," on page 136 of "Electronics," vol. 19, October 1946.

Consider first the arrangement of STMV No. 1 (single-trip multivibrator No. 1) comprising the three-electrode tubes 318 and 328, respectively, equipped with plates 322 and 332, grids 321 and 331, and cathodes 319 and 329 energized by the heater elements 320 and 330. The higher frequency components of the square wave output of 317 pass through condenser 324 and are impressed on the grid 321 of tube 318. Resistance 325 provides a high resistance direct current path from grid 321 to ground. Cathodes 319 and 329 of tubes 318 and 328 are connected together and through resistance 326 to ground. The grid 331 of tube 328 is connected through high resistance 334 to a positive voltage source 337 supplying, for example, 200 volts with the negative side grounded. Tube 328 therefore normally conducts plate current which flows through resistance 326 and biases tube 318 to cut-off. On reception through condenser 324 of a short positive pulse, tube 318 passes plate current from battery 337 through resistance 335 to plate 322, through the tube 318 and thence through resistance 326 back to ground. As plate 322 of tube 318 changes to a less positive potential due to voltage drop in resistance 335, a negative pulse is transmitted through condenser 333 which drives the grid 331 of tube 328 below cut-off. As this pulse is dissipated by resistance 334 the potential of grid 331 gradually returns to a more positive value until plate current starts to flow in tube 328, at which time the plate current from tube 328 flowing in common cathode resistance 326 again biases tube 318 to cut-off. Thus, it will be seen that for each short positive pulse applied to the grid 321 of tube 318, a cycle is initiated which causes the transfer of plate current flow from tube 328 to tube 318 for a length of time dependent on the time constant of condenser 333 and resistance 334. The voltage at the plate 332 of tube 328 during this period rises to a more positive value and returns at the end of the period. The plate 332 of tube 328 is connected through resistance 339 to the grid 346 of the three-electrode tube 343 which is also equipped with a plate 347 and cathode 344 energized by the heater 345. The grid 346 is also connected to a source 341 of negative voltage with respect to ground, through resistance 340. When the potential of plate 332 of tube 328 is at its normal potential during the interval in which plate current is flowing through resistance 336, the potential on the grid 346 of tube 343 is so negative with respect to the cathode 344 as to cut off plate current flow in tube 343. Under the condition in which no plate current is flowing in tube 328, the potential of plate 332 assumes a more positive value, and correspondingly the potential of grid 346 of tube 343 becomes sufficiently positive to allow plate current to flow in tube 343. As mentioned hereinbefore, this plate current flow through resistance 348 causes the switching amplifier No. 1 to be biased to cut-off. Switching amplifier No. 1 remains cut off for the duration of the operation of STMV No. 1.

The multivibrator circuit STMV No. 2, which as hereinbefore mentioned is connected in parallel with STMV No. 1, comprises the three-electrode tubes 360 and 371 which respectively include plates 364 and 375, grids 363 and 374, and cathodes 362 and 372 energized by the heaters 361 and 373.

Operation of STMV No. 2 is similar to that of STMV No. 1 with condensers 377 and 365 performing corresponding functions to condensers 324 and 333 respectively. Tubes 360 and 371 operate in the manner of tubes 318 and 328 respectively. Resistances 378, 379, 368, 367, 366 and battery 369 perform corresponding functions to resistances 325, 326, 336, 334, 335 and battery 337, respectively. The magnitude of the time constant of the circuit consisting of condenser 365 and resistance 367 is only half as great as the time constant of the circuit consisting of condenser 333 and resistance 334, however. The plate 364 of tube 360 is coupled through a small condenser 356 to the grid 354 of tube 351, which is a conventional triode having a plate 355 and a cathode 352 energized by the heater 353. A negative bias is applied to grid 354 of tube 351 from battery 358 through high resistance 357, which normally cuts off plate current flow in tube 351. The plate 355 of tube 351 is connected to one end of the primary winding of transformer 314 so that pulses of plate current flowing in tube 351 will be transmitted through transformer 314 to the radio transmitter 380. These pulses of plate current in tube 351 occur at the end of the operated period of STMV No. 2 when the potential of plate 364 of tube 360 returns to its normal high positive value, sending a positive pulse of current through condenser 356 to make the potential of the grid 354 of tube 351 momentarily less negative whereby plate current flows in tube 351.

The operation of the transmitting equipment described in the foregoing pages with reference to Fig. 3 is as follows:

Speech from the subset 301 is transmitted through a switching amplifier to the radio transmitter 380. Every 0.33 second, this switching amplifier is blocked to through transmission for a short period by making the grids of tubes 308*a* and 308*b* very negative. During this blocked period, which may be of the order of 4 to 10 milliseconds, a short impulse is sent to the radio transmitter by the passage of current through tube 351 from one end of transformer 314. Representative wave shapes are as shown on Fig. 7A.

Figure 7A:
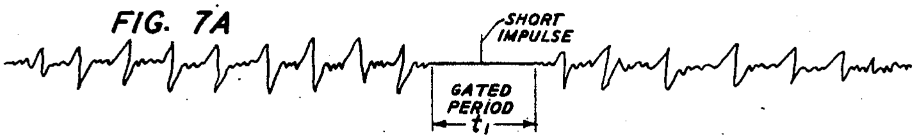
Figure 7B:
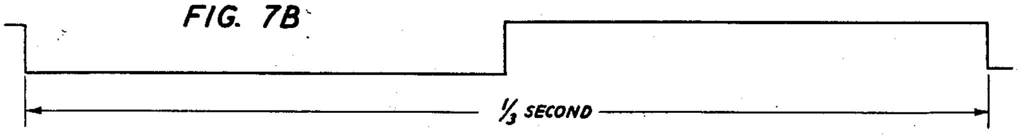
Figure 7C:
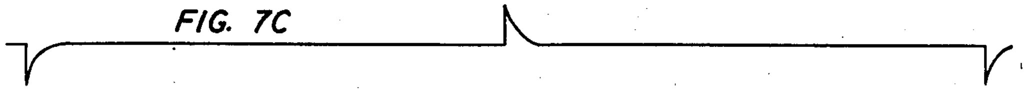

The gating and short impulse features of the circuit are synchronized by means of the oscillator 316 which operates through the multivibrator frequency step-down circuit 317, the output of which is a repetitive square wave with a period of one-third of a second, such as shown in Fig. 7B. This produces small pips at the grids of tubes 318 and 360 due to the differentiating action of condenser 324 with resistance 325 and condenser 377 with resistance 378. These pips are substantially of the form shown in Fig. 7C.

It is apparent that the negative pips do not operate to trip the single-trip multivibrators Nos. 1 and 2, whereas the positive pips do. STMV (single-trip multivibrator) No. 1 has a period of from 4 to 10 milliseconds, and STMV No. 2 has a period half as long as that of STMV No. 1.

Figure 7D:
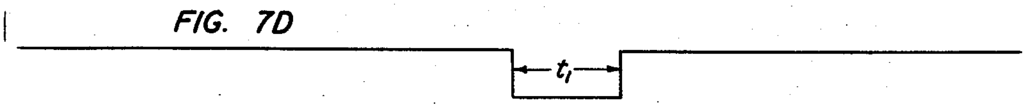

The action of STMV No. 1 through the direct current amplifier stage using tube 343, is to cause the voltage at the plate 347 of tube 343 to drop from its normal value of ground potential to a more negative value during the period $t_1$ of the gating interval, as shown on Fig. 7D. During the gated period $t_1$ therefore, tubes 308*a* and 308*b* are biased to cut-off. At the end of the operated period of STMV No. 1, tube 343 returns to a cut-off condition, leaving normal operating bias on tubes 308*a* and 308*b*.

Figure 7E:
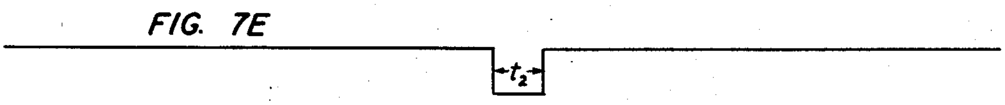

The operated period $t_2$ of STMV No. 2 is just half that of STMV No. 1, so the voltage at the plate 364 of tube 360 is as shown by Fig. 7E.

Figure 7F:
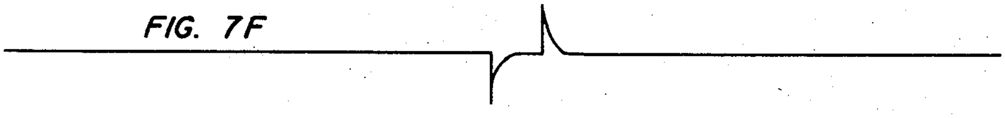

This causes pips to appear at the grid of tube 351 which are substantially of the wave shape shown on Fig. 7F. The positive pip drives the grid of tube 351 to saturation so that a large current is drawn through the plate circuit from transformer 314, causing a short impulse to appear at the output of the switching amplifier No. 1, and to accordingly be transmitted to the receiving station by means of the conventional radio transmitting equipment 380.

Figure 4:
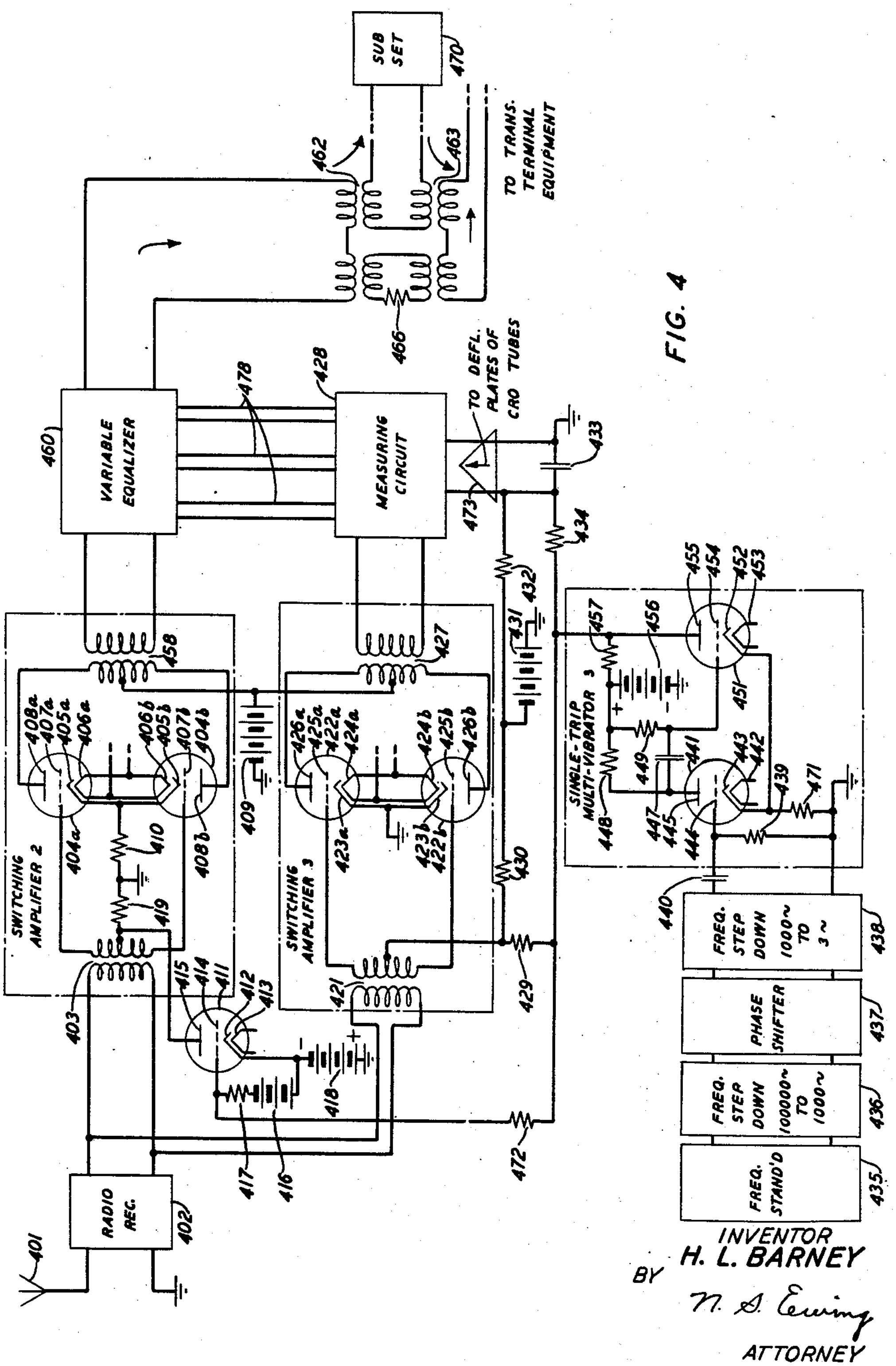
Fig. 4 shows a receiving circuit for equalizing fading which corresponds to the foregoing transmitting circuit.

The receiving circuit of the system under description is shown in Fig. 4 of the drawings. The input from the receiving antenna 401 passes into the conventional radio receiving circuit 402, the output of which is normally connected through the switching amplifier No. 2, variable equalizer and terminating circuit to the subset 470 which is similar to the subset 301 described with reference to Fig. 3 for the reception of audio telephone signals from the transmitting station. At intervals of a third of a second, the connection to the subset 470 is blocked for a few milliseconds by the switching amplifier No. 2. actuated through a circuit which includes the single-trip multivibrator STMV No. 3 driven by the frequency standard 435 operating in long range synchronism with the frequency standard 316 of Fig. 3. Simultaneously, the aforesaid circuit actuates the switching amplifier No. 3 to enable reception of the impulse response in the measuring circlit 428, the output of which controls operation of the variable equalizer 460. Details of the measuring circuit 428 and the equalizing circuit 460 will be described in detail hereinafter with reference to Figs. 5 and 6, respectively.

Referring in detail to Fig. 4, the output of radio receiver 402 is connected to primary winding of transformers 403 and 421 in parallel. The secondary of transformer 403 is connected to grids 407*a* and 407*b* of push-pull tubes 404*a* and 404*b* which are conventional triodes having plates 408*a* and 408*b*, and cathodes 405*a*, 405*b*, energized by heaters 406a, 406b. The center tap of the secondary winding is connected to ground through resistance 419. The cathodes 405a and 405b of tubes 404a and 404b are connected together and to ground through resistance 410. Plates 408a and 408b of tubes 404a and 404b are connected to the primary of transformer 458. A source of positive voltage 409 is connected to the center tap of primary of transformer 458 to supply plate current to tubes 404a and 404b. The secondary of transformer 458 is connected to the input of variable equalizer 460, which is designed in accordance with this invention, to compensate for variations in the loss-frequency characteristic of the radio path in a manner which will be described in detail hereinafter. The output of the variable equalizer 460 is connected to a terminating network comprising transformers 462 and 463 with balancing resistance 466, through which signals are transmitted to the conventional subscriber's subset 470.

Consider now the path of signals through switching amplifier No. 3 which includes the conventional three-electrode tubes 422a and 422b having plates 426a, 426b, grids 425a, 425b, and cathodes 423a, 423b energized by heaters 424a, 424b. The secondary of transformer 421 is connected to grids 425a and 425b of tubes 422a and 422b. The cathodes of tubes 422a and 422b are connected to ground. Grid bias for tubes 422a and 422b is provided through the connection to the center tap of the secondary of transformer 421 of a lead from the junction of resistances 429 and 430. The other end of resistance 430 is connected to a source of negative voltage with respect to ground 431. The other end of resistance 429 is connected to the plate 455 of tube 451, of the single-trip multivibrator circuit No. 3 which will be described hereinafter.

Continuing with the description of switching amplifier No. 3, the plates 426a and 426b of tubes 422a and 422b are connected to the primary of transformer 427. Connected to the mid-point of the primary of transformer 427 is a source of positive voltage with respect to ground 409. The secondary of transformer 427 is connected to a measuring circuit 428 which is designed in accordance with this invention, to supply the proper control currents to the variable equalizer 460 to compensate for variations in loss versus frequency in the radio path. The measuring circuit 428 is shown in detail in Fig. 6, which will be described hereinafter.

The enabling and disabling of the switching amplifiers Nos. 2 and 3 is controlled as follows. A stable source of oscillations 435, of a type similar to the oscillator 316 described with reference to Fig. 3 hereinbefore has its output connected to a multivibrator type step-down circuit 436 which is similar to circuit 317 described in connection with Fig. 3. This steps the frequency down from 100,000 cycles per second to 1000 cycles per second. The output of frequency step-down circuit 436 is connected to phase shifter 437. Phase shifter 437 may be any one of a number of types known in the art which are adapted to produce a continuous cyclical variation in phase of the waves passing therethrough in accordance with the rotation of a special condenser rotor connected in the circuit. Two circuits of this type are described on page 949, Figs. 56d and 56c, of the "Radio Engineer's Handbook" by R. E. Terman, McGraw-Hill Book Company, Inc., 1943. The output of phase shifter 437 is connected to a circuit comprising additional frequency step-down stages 438 to step the frequency down to 3 cycles per second, for example. This 3-cycle wave output of the step-down unit 438 is essentially in the form of a series of square wave pulses and operates to actuate STMV No. 3 in the same manner as explained with reference to the STMV No. 1 on Fig. 3. The three-electrode vacuum tubes 441 and 451 which respectively include plates 445 and 455, grids 444 and 454, and cathodes 443 and 452 energized by heaters 442 and 453 perform the same functions as tubes 318 and 328 of Fig. 3. Condensers 440 and 447 perform the same functions as the condensers 324 and 333 of Fig. 3, and resistances 439, 471, 448, 449 and 457 are the counterparts of resistances 325, 326, 335, 334 and 336 of Fig. 3, respectively. Here again, the second tube 451 of the multivibrator STMV No. 3 is normally conducting, and the first tube 441 is cut off. During recurrent intervals of a few milliseconds every third of a second, the flow of plate current is transferred from the second to the first tube, and then back again. During this short interval when tube 451 is cut off and its plate 455 is at a high positive potential, switching amplifier No. 3 is enabled and switching amplifier No. 2 is cut off. Since the plate 455 of tube 451 is connected in series to resistances 429, 430, and source of negative voltage with respect to ground 431, the potential at the junction between resistances 429 and 430 will vary proportionately with variation in plate potential of plate 455. When no plate current is flowing in tube 451, the potential of this junction is a few volts negative with respect to ground which places the grids 425a and 425b of tubes 422a and 422b at a potential a few volts negative with respect to the corresponding cathodes 423a and 423b, thus allowing the switching amplifier No. 3 to transmit signals.

Also connected to the plate 455 of tube 451 is a series circuit comprising resistances 472 and 417 and batteries 416 and 418. The battery 418 provides a negative bias for the cathode 412 of the three-electrode tube 411, while the battery 416 provides an additional negative bias for the grid 414 which opposes the positive IR drop through the resistances 472 and 417 from the positive potential source 456. When the potential of plate 455 is high, corresponding to a condition of no plate current flow in tube 451, the potential of grid 414 of tube 411 is approximately the same as that of the cathode 412 thereof. In this condition the tube 411 becomes current conducting through a circuit from ground through resistance 419, the plate 415, and cathode 412 to the source of negative voltage with respect to ground 418. This biases the grids 407a and 407b of tubes 404a and 404b to cut-off, suppressing transmission through switching amplifier No. 1. In the normal condition, the potential of the plate 455 of tube 451, is less positive, and correspondingly the potential of grid 414 of tube 411 is more negative with respect to potential of the cathode 412, with the result that tube 411 is cut off. This allows tubes 404a and 404b to operate with normal amplifying bias on grids 407a and 407b.

Figure 5:
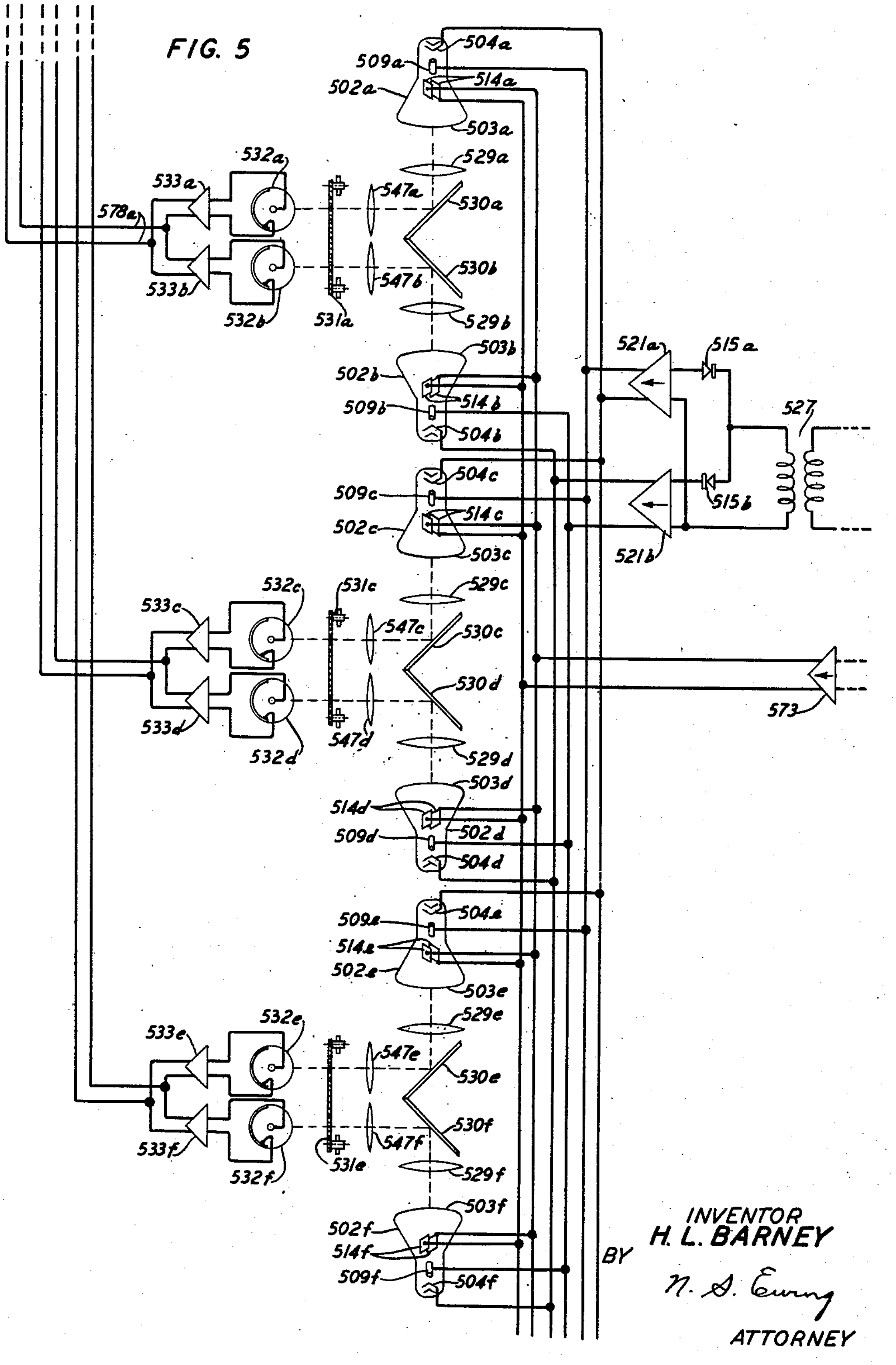
Fig. 5 shows details of the measuring circuit 428 of Fig. 4.

The deflecting voltage used on the deflection plates 514a, 514b, etc. of cathode-ray tubes 502a, 502b, etc. in measuring circuit 428 which will be described hereinafter with reference to Fig. 5 is generated by a combination of resistances and a condenser connected to the plate 455 of tube 451. Resistances 434 and 432 and battery 431 are connected between plate 455 and ground. Condenser 433 is connected between the junction of resistances 434 and 432. The voltage across condenser 433 varies only a few volts as the potential of plate 455 switches between its two values in the manner previously described. The voltage across condenser 433 is amplified by amplifier 473 and applied to the deflection plates 514a, 514b, etc. of the cathode-ray tubes 502a, 502b, etc. in measuring circuit 428, to initiate operation of the sweep circuits as will be described hereinafter.

Fig. 5 shows circuit details of a measuring circuit 428 indicated in the receiving circuit of Fig. 4 which comprises a plurality of cathode-ray tubes connected in parallel as transversal filters such as described with reference to Fig. 2, which respectively control the inputs to the separate amplifiers in the equalizer circuit 460 described with reference to Fig. 6 hereinafter. In Fig. 5 are shown those units of an array of measuring circuits, each of which is identical in arrangement with the circuit of Fig. 2 previously described. The output of the switching amplifier No. 3 of Fig. 4 is connected to the primary of transformer 527 of Fig. 5. The secondary of transformer 527 is connected to rectifying elements 515a and 515b which are so poled that the negative half of the wave is transmitted through 515a and amplifier 521a and the positive half of the wave is transmitted through 515b and amplifier 521b. Amplifiers 521a and 521b of Fig. 5 correspond to amplifiers 221a and 221b of Fig. 2, and the operation of the following circuit including cathode-ray tubes 502a and 502b is the same as described in connection with Fig. 2. Amplifier 573, which is the same as amplifier 473 of Fig. 4, has its output connected to the deflection plates 514a, 514b, 514c, 514d, 514e and 514f in parallel.

The film 531a has recorded on it, in variable density sound on film recording, a single sine wave frequency which corresponds to the peak frequency of the tuning of inductance 668a and capacity 669a to be described hereinafter with reference to the equalizing circuit of Fig. 6. If, for example, this resonant frequency were 400 cycles per second, film 531a of Fig. 5 would have a 400-cycle per second sine wave recorded on it and would be run past photocells 532a and 532b in a direction normal to the plane of the drawing as shown. The output of the combined amplifiers 533a and 533b constitutes the control signal for the particular amplifier circuit of the variable equalizer of Fig. 6 which utilizes inductance 668a and capacitance 669. Thus the gain of the variable equalizer 460 of Fig. 4 is controlled in the region around 400 cycles.

Figure 6:
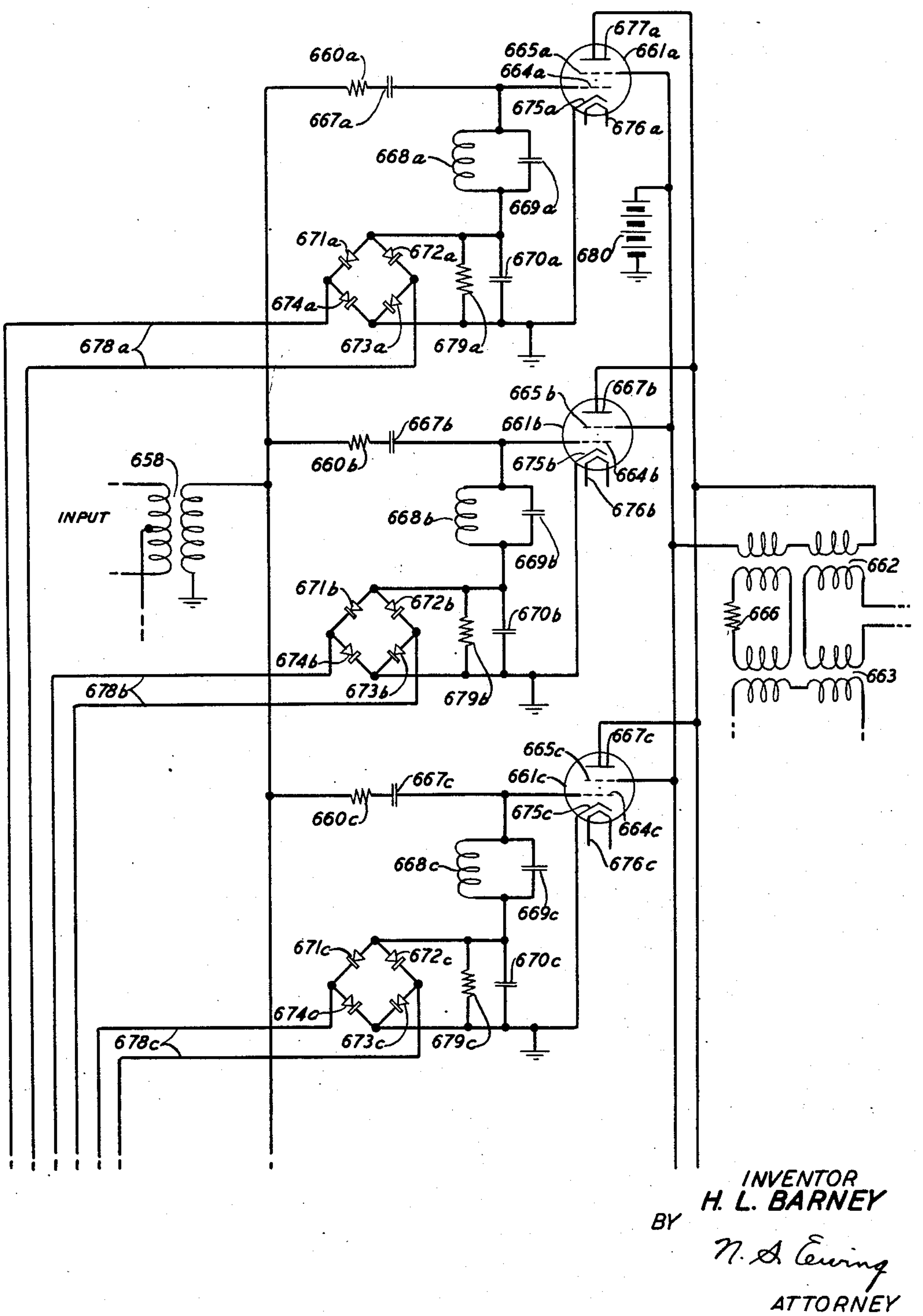
Fig. 6 shows details of the variable equalizer 460 of Fig. 4.

The operation of the other parallel-operated measuring circuits of Fig. 5 is the same as in the foregoing paragraphs with the exception that the film strips 531b and 531c have recorded on them frequencies which differ from that on 531a, and which correspond to the frequencies selected from the frequency bands to which the respective amplifiers of the equalizer circuit of Fig. 6 are tuned as will be described hereinafter. For purposes of illustration, these frequencies might be 800 and 1200 cycles per second.

Fig. 6 shows in detail the variable equalizer circuit 460 of Fig. 4, which comprises a plurality of amplifier circuits connected in parallel, each one of which is tuned to a different one of the sub-frequency bands into which the transmission band of the system under description has been subdivided for control purposes by the measuring circuit described with reference to Fig. 5 in the foregoing paragraphs. The transformer 658 which corresponds to the transformer 458 of Fig. 4, has its secondary connected to a number of amplifier grid circuits in parallel. The connection from transformer 658 to the control grid 664a of screen grid tube 661a proceeds through high series resistance 660a and condenser 667a. The cathode 675a of tube 661a which is energized by the heater 676a, is connected to ground. Shunted across from grid 664a to ground is the antiresonant circuit consisting of inductance 668a and condenser 669a, in series with relatively large by-pass condenser 670a. Rectifier elements 671a, 672a, 673a and 674a are arranged as a full wave rectifier to supply a negative voltage from ground, across condenser 670a when a control signal is supplied on leads 678a which are connected to the measuring circuit 428 of Fig. 4. The magnitude of the negative voltage across condenser 670a determines the gain of tube 661a by control of the bias of control grid 664a. Larger measuring signal currents on leads 678a cause more rectified voltage across condenser 670a which in turn reduces the gain of tube 661a. As the signal across lead 678a decreases in amplitude, condenser 670a discharges through resistance 679a, allowing the grid 664a of tube 661a to operate at a less negative portion of its characteristic, thus increasing the gain through tube 661a.

The plate 677a of tube 661a is connected to one side of transformer 662. Plate voltage from battery 680 is connected to the other end of the primary of transformer 662, and also to the screen grid 665a of tube 661a. Transformer 662 corresponds to transformer 462 shown in Fig. 4, and resistance 666 and transformer 663 likewise correspond to elements 466 and 463 of Fig. 4.

The amplifier stage using tube 661a is tuned by inductance 668a and condenser 669a so as to provide amplification over only a part of the frequency range. The other amplifier circuits using tubes 661b and 661c whose plate circuits are connected in parallel with those of tube 661a operate in the same manner as the stage just described, but their tuned circuits consisting of inductances 668b and 668c and condensers 669b and 669c, are tuned to two other frequency ranges. Thus the entire frequency range of interest is covered by a number of these circuits in parallel. The aforesaid parallel circuits are so designed that if all were operated with the same values of grid bias supplied from their associated rectifiers, the over-all loss-frequency characteristic of the combined circuits in the variable equalizer would be essentially flat or uniform.

Figure 8A:
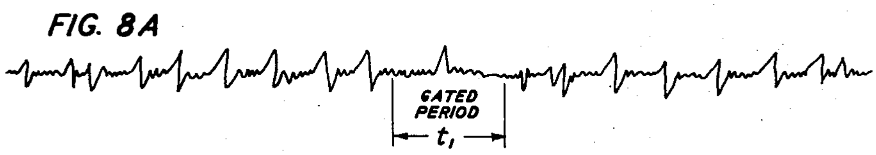

The operation of the receiving terminal equipment which has been described in detail with reference to Figs. 4, 5 and 6, is as follows:

The signal received from the radio circuit appears, for example, as indicated in Fig. 8A of the drawings. Included in the first part of the gated period some transients and delayed components of the preceding speech will appear. The short impulse will not be a single sharp pulse such as was shown at the transmitter, but will have a distorted form according to the herein-before described *g*-function of the transoceanic system under description. During the gated period, the switching amplifier No. 2 using tubes 404a and 404b is blocked by application of large negative bias to their respective grids 407a and 407b, and switching amplifier No. 3 is enabled by having the grid bias of tubes 422a and 422b brought up from cut-off to normal operating bias. Thus during the gated period, the signal is switched from the line leading finally to the subscriber's subset 470 to the measuring circuit 428. This measuring circuit 428, operating as previously described in connection with Fig. 5, supplies control currents for the variable equalizer 460.

As in the transmitter, synchronization of the receiving circuit is brought about by the crystal-controlled oscillator 435 operating into the multivibrator step-down units 436 and 438 to produce square-topped reference pulses. The frequency is first stepped down to the order of 1,000 cycles, at which frequency the continuously variable phase shifter 437 serves to synchronize the receiving gating with the transmitting gating in the initial adjustment of the circuit. Following the 1,000 phase shifter 437, more step-down stages 438 reduce the frequency to 3 cycles. At the output of step-down stages 438 the wave shape is the same as that shown on Fig. 7B for the transmitting terminal. STMV No. 3 operates in the same manner as STMV No. 1 of Fig. 3 to control the switching amplifier No. 2, except for the fact that switching amplifier No. 3 is normally cut off and is enabled by bringing the bias on grids 425a and 425b of tubes 422a and 422b up to the normal operating point during the short period $t_1$ of operation of STMV No. 3.

Figure 8B:
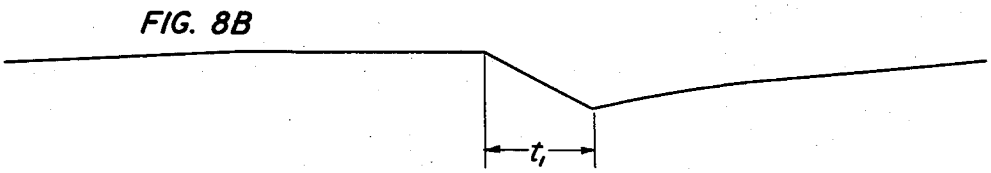

The deflecting voltage for the cathode-ray tubes 502a, etc. in the measuring circuit 428 are supplied as hereinbefore mentioned by resistances 432, 434 and condenser 433. The voltage across condenser 433 appears substantially as shown in Fig. 8B of the drawings. During the interval $t_1$ the $g$-function is laid down on the screen 502a, etc. of the cathode-ray tube 503a etc., and during the remainder of the one-third second interval the intensity of the electron beam is reduced substantially to zero, as no signals are arriving at the measuring circuit 428, so that no interference is caused during retrace.

In order to maintain synchronism of transmitting and receiving gating, the phase shifter 437 would have to be adjusted from time to time, which could be done by either automatic or by manual means.

As a further feature of the system, in case the decay of phosphorescence on the cathode-ray tube screens introduces distortion into the measuring circuit, the outputs of the rectifier circuits in the variable equalizer 460 could be gated; that is, the lead connecting the ungrounded sides of resistance 679a and condenser 670a, for example, could be opened at all times except for a short period immediately following the beginning of each impulse period whereby a control current is thus provided which can be maintained at a constant value during the remainder of the one-third second interval instead of being permitted to vary as the image fades on the face of the cathode-ray tube.

It is apparent that a system for equalizing fading in electrical transmission systems, such as described hereinbefore with reference to Figs. 3, 4, 5 and 6, compensates only for signal distortions arising from variations in amplitude in the different frequency bands. Similar signal distortions may also arise in some systems from unequal phase fluctuations in the different frequency bands. Inasmuch as the impulse response completely defines the characteristics of the test system with respect to phase versus frequency as well as amplitude versus frequency, it will be apparent to those skilled in the art that the present invention can readily be applied to the reduction of phase distortion also.

Moreover, it will be apparent to those skilled in the art that although the principles of the present invention have been described herein with reference to certain specific embodiments comprising particular component elements, the scope of the invention is not limited to the specific embodiments herein shown, or to the use of any of the particular component elements which they comprise.

What is claimed is:

1. A system for measuring the characteristics of a test electrical transmission system which comprises in combination means for impressing an electrical impulse on said test system, reproducing means connected to the output of said transmission system for reproducing the current output of said system in response to said applied electrical impulse, means for supplying simultaneously a plurality of different frequency signals selected over a predetermined band of frequencies, means in energy transfer relation with said means for supplying a plurality of signals and responsive to the output of said reproducing means for separately and simultaneously modulating said signals of different frequency in accordance with said current output, and means responsive to said last-named means for collecting the modified different frequency output currents.

2. A system for measuring the characteristics of a test electrical transmission system which comprises in combination means for periodically impressing an electrical impulse on said test system, detecting means connected to the output of said test system for detecting the impulse response thereof, a cathode-ray tube responsive to the output of said detecting means to produce a trace which is intensity varied in accordance with said impulse response, means for separately modifying the light output of said cathode-ray tube with a plurality of different frequency signals, and means responsive to said last-named means for collecting said respective modified signals.

3. A system in accordance with claim 2 in which said means for separately modifying the light output of said cathode-ray tube with a plurality of different frequency signals comprises a film having variations in density in accordance with said different frequency signals, said film positioned to receive the light from the trace on said cathode-ray tube, and means for producing relative progressive movement between said film and said trace.

4. A fading equalized electrical transmission system which comprises at one end a transmitter, a signal source, an impulse generator, means for connecting said signal source and said impulse generator to said transmitter; and at the other end: an impulse response receiver for receiving the current output of said system in response to a voltage impulse applied to said system by said impulse generator, signal receiving means, a plurality of different frequency signal responsive circuits connected to said signal receiving means for separating the received frequency band into a plurality of frequency subbands, means connected to said impulse response receiver for modulating a selected frequency signal from each of said subbands in accordance with said current output, and means separately responsive to the modulated currents from said last-named means to control the outputs of said different frequency signal responsive circuits.

5. A system for equalizing fading in an electrical transmission system including conventional signal transmitting means which comprises in combination a periodic impulse generator, a first switching means constructed to disconnect said conventional transmitting means and to connect said impulse generator to the input of said transmission system at periodic intervals, impulse response detecting means, a plurality of conventional transmission receiving means connected in parallel each responsive to a different frequency subband of signals transmitted by said transmission system, a second switching means constructed to disconnect said conventional receiving means and connect said impulse response detecting means to the output of said transmission system, a cathode-ray oscilloscope including means for producing an electron beam, a screen disposed in the path of said beam and deflecting means to control the motion of said beam on said screen, means to control the intensity of said beam in accordance with the output of said impulse response detecting means, means connected to said deflecting means nad responsive to said impulse generator for synchronizing the operation of said deflecting means with the operation of said impulse generator, a plurality of moving films respectively positioned to receive light from the screen of said cathode-ray oscilloscope, each of said films having a frequency characteristic which is selected from a respective one of said subbands, means for separately collecting the light output from said cathode-ray oscilloscope passing through each of said films to produce different frequency electric signals, and a plurality of equalizers respectively responsive to said different frequency signals to control the respective outputs of said different frequency subband receiving means.

HAROLD L. BARNEY.

REFERENCES CITED

The following references are of record in the file of this patent:

UNITED STATES PATENTS

| Number | Name | Date |
|---|---|---|
| 2,159,790 | Freysted et al. | May 23, 1939 |
| 2,285,038 | Loughlin | June 2, 1942 |
| 2,378,383 | Arndt | June 19, 1945 |
| 2,410,424 | Brown | Nov. 5, 1946 |
| 2,416,290 | Depp | Feb. 25, 1947 |
| 2,416,895 | Bartelink | Mar. 4, 1947 |